United States Patent [19]

Inaba

[11] Patent Number: 4,696,632
[45] Date of Patent: Sep. 29, 1987

[54] MOLD OPENING/CLOSING SPEED CONTROL DEVICE

[75] Inventor: Yoshiharu Inaba, Kawasaki, Japan

[73] Assignee: Fanuc Ltd, Minamitsuru, Japan

[21] Appl. No.: 752,621

[22] PCT Filed: Dec. 26, 1984

[86] PCT No.: PCT/JP84/00618
§ 371 Date: Jul. 8, 1985
§ 102(e) Date: Jul. 8, 1985

[87] PCT Pub. No.: WO85/02812
PCT Pub. Date: Jul. 4, 1985

[30] Foreign Application Priority Data

Dec. 28, 1983 [JP] Japan .................... 58-245421

[51] Int. Cl.$^4$ .................................. B29C 45/80
[52] U.S. Cl. .......................... 425/150; 264/40.5; 425/162; 425/167; 425/171; 425/590; 425/451.2
[58] Field of Search ............ 425/25, 162, 167, 169, 425/171, 451, 451.2, 135, 150, 590; 264/40.5, 40.7

[56] References Cited

U.S. PATENT DOCUMENTS 3,616,495 11/1971 Lemelson .................... 425/162
3,857,658 12/1974 Muzsnay .................... 425/451.2
4,540,359 9/1985 Yamazaki .................... 425/135

FOREIGN PATENT DOCUMENTS 3418 2/1978 Japan .
124632 9/1980 Japan .

Primary Examiner—Jay H. Woo
Assistant Examiner—Timothy W. Heitbrink
Attorney, Agent, or Firm—Staas & Halsey

[57] ABSTRACT

A mold opening/closing speed control device wherein an opening/closing speed switching position for molds in a mold clamping unit in an injection molding apparatus can be taught by the control device. The control device is set in a teaching mode (101), a servo motor (M) is driven at a low speed to move (102) the molds, speed switching positions P1, P2 and P3 are stored (103, 104, 205, 106, 109) by a teaching device, and the opening/closing speed control of the molds is performed (110, 123) by the servo motor in accordance with the stored positions.

6 Claims, 4 Drawing Figures

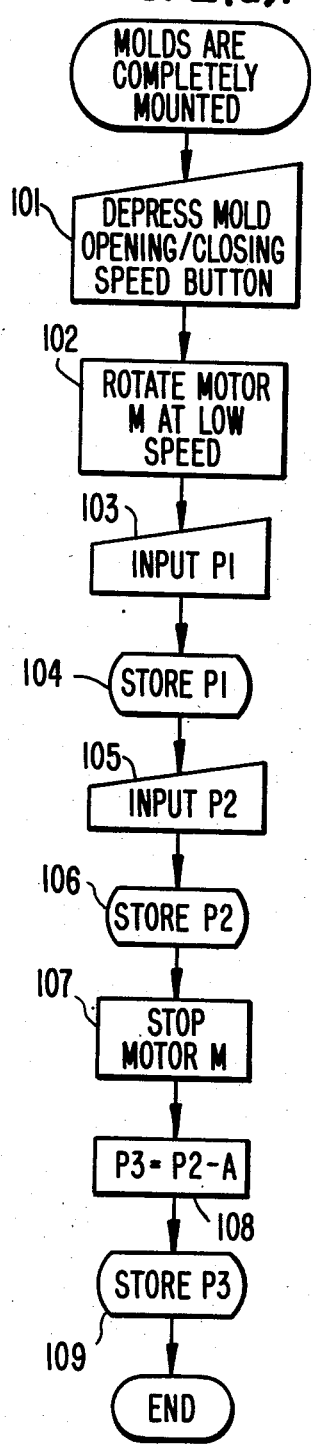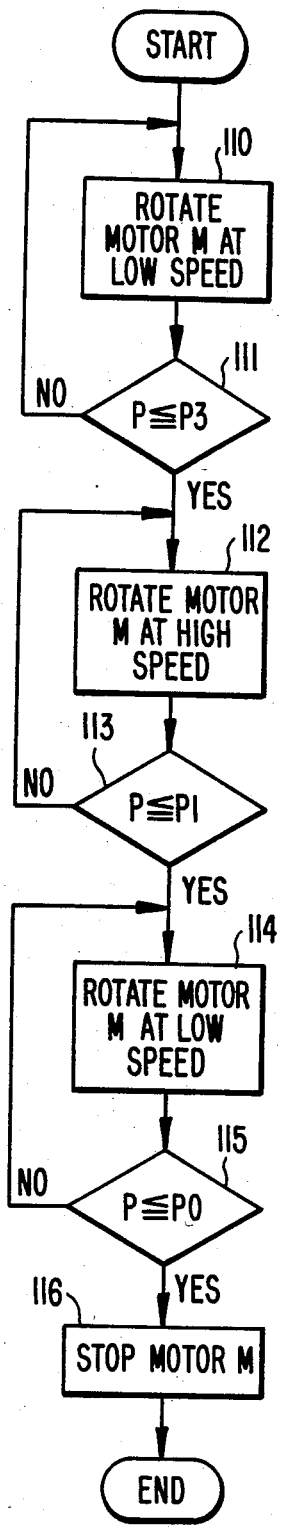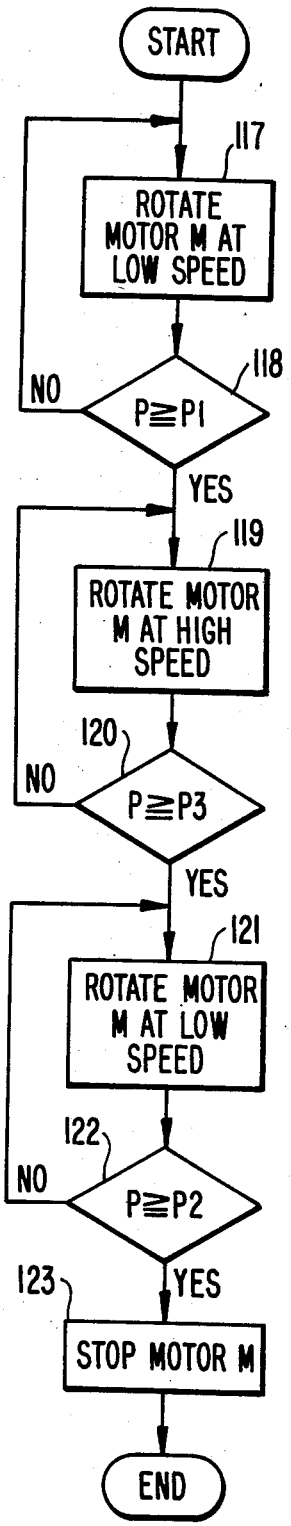

MOLD OPENING/CLOSING SPEED CONTROL DEVICE

BACKGROUND OF THE INVENTION

The present invention relates to a mold opening/closing speed control device in an injection molding apparatus and, more particularly, to a mold opening/closing speed control device wherein a carrier acceleration/deceleration position, determined by a mold clamping mechanism for opening/closing molds, is numerically taught and stored in the control device.

In mold opening/closing speed control of a mold clamping mechanism in a conventional injection molding apparatus, a limit switch, a proximity switch, or the like is arranged at an acceleration/deceleration position to control a mold opening/closing speed. For this reason, the position of the limit switch, the proximity switch or the like must be precisely adjusted. As a result, reliability of such a switch determines the reliability of the control device itself, resulting in inconvenience.

SUMMARY OF THE INVENTION

It is, therefore, an object of the present invention to solve the conventional problem and provide a mold opening/closing speed control device which does not employ a switch such as a limit switch, and which is used in an injection molding apparatus.

It is another object of the present invention to provide a mold opening/closing control device in an injection molding apparatus, wherein an acceleration/deceleration position of a mold opening/closing speed can be numerically taught.

In order to achieve the above objects of the present invention, there is provided a mold opening/closing speed control device in an injection molding apparatus, comprising teaching/operation mode selecting means for selecting one of a teaching mode for teaching an acceleration/deceleration position of a mold opening/closing speed and an operation mode for opening/closing molds; teaching means for instructing the acceleration/deceleration position; memory means for storing the acceleration/deceleration position; mold driving means for moving the molds; and position detecting means for detecting a moving position of the molds; and control means for, in the teaching mode, causing the mold driving means to move the molds at a low speed and storing in the memory means a mold position detected by the position detecting means in response to an instruction from the teaching means, and for, in the operation mode, changing the opening/closing speed of the molds in accordance with the mold position stored in the memory means.

According to the present invention, the acceleration/deceleration position of the opening/closing speed of the molds can be arbitrarily taught, and a position for changing the mold opening/closing speed can be easily set even if the molds are replaced with other molds, thereby providing optimal mold opening/closing speed control for the corresponding molds. Unlike the conventional control device, an installation position of the limit switch or the like need not be adjusted, and operation can be simplified.

BRIEF DESCRIPTION OF THE DRAWINGS

FIGS. 2(a), 2(b) and 2(c) are flow charts for explaining the operation of the device of FIG. 1.

DETAILED DESCRIPTION OF THE PREFERRED EMBODIMENT

Figure 1:
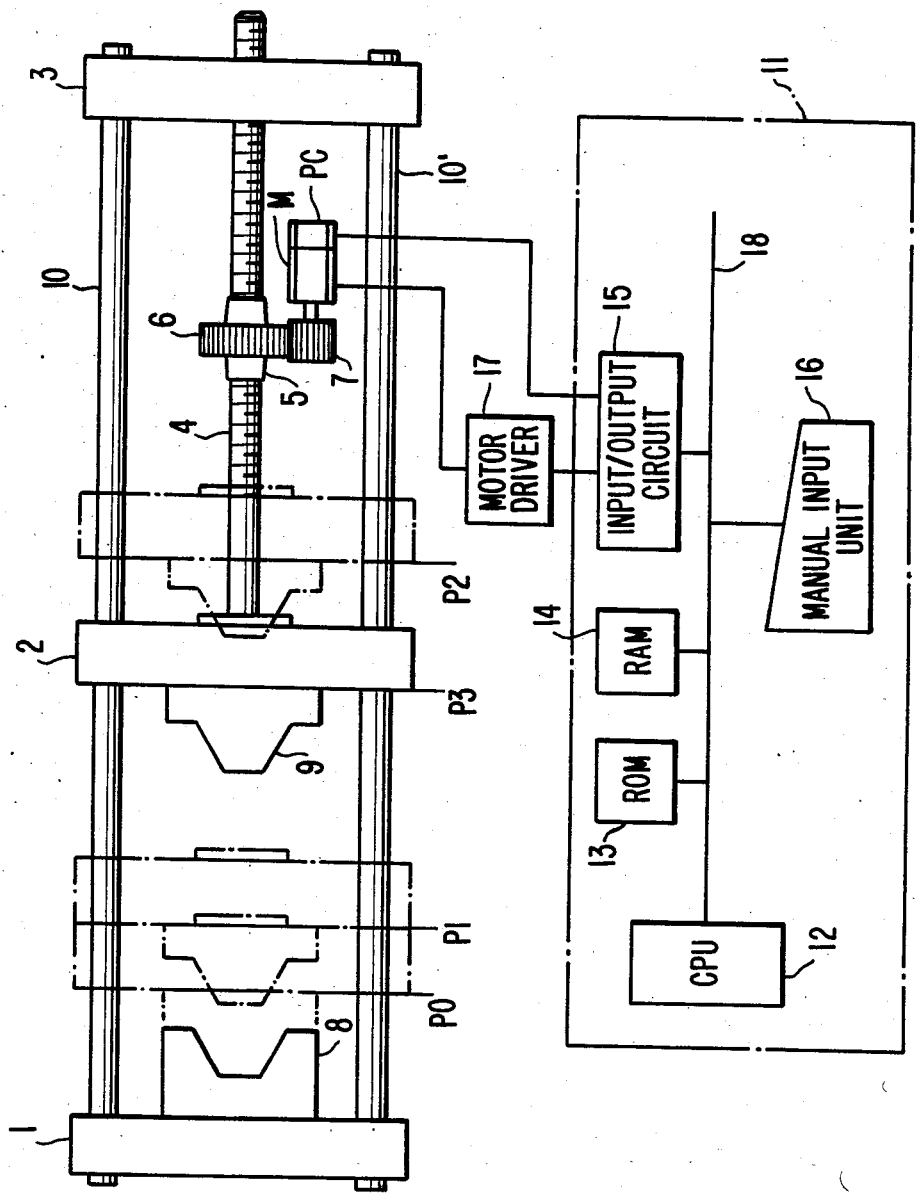
FIG. 1 is a block diagram of a mold opening/closing speed control device according to an embodiment of the present invention.

The present invention will be described in detail with reference to the accompanying drawings.

FIG. 1 shows a mold opening/closing speed control device according to an embodiment of the present invention. Reference numerals 1 and 3 denote bases; and 2, a carrier. Molds 8 and 9 are mounted on the base 1 and the carrier 2, respectively. A ball screw 4 is fixed on the carrier 2. A nut 5 threadably engaged with the ball screw 4, a gear 6 integrally formed with the nut 5, a gear 7 meshed with the gear 6, and a servo motor M for driving the gear 7 constitute a mold driving means. The carrier 2 is moved by the mold driving means in the right-and-left direction of FIG. 1.

Reference numerals 10 and 10' denote tie bars. Reference symbol PC denotes a position sensor serving as a position detecting means for detecting a rotational position of the servo motor M. Reference numeral 11 denotes a controller for controlling a rotational speed (i.e., a mold opening/closing speed by the carrier 2) of the servo motor M; 12, a central processing unit (to be referred to as a CPU hereinafter); 13, a ROM for storing a control program for controlling the overall operation of the control device; and 14, a RAM, i.e., a memory means for storing processed results and an acceleration/deceleration position (to be described later) of the carrier 2. Reference numeral 15 denotes an input/output circuit which is connected to a motor driver 17 for the servo motor M, and to the position sensor PC. Reference numeral 16 denotes a manual input unit which has a selection switch serving as a teaching/operation mode selecting means for selecting a teaching or operation mode and a switch of a teaching means for teaching a teaching point. Reference numeral 18 denotes a bus.

Referring to FIG. 1, reference symbols P0 to P3 denote acceleration/deceleration positions of the carrier 2, respectively. The position P0 represents a closing position of the molds 8 and 9. The position P1 represents a position where the molds 8 and 9 are opened to be no longer in contact with each other and slightly separated from each other. The position P2 represents an open position of the molds 8 and 9 while the carrier 2 is stopped. The position P3 represents an acceleration/deceleration switching position of the carrier 2. In operation, the carrier 2 is moved at a low speed between the positions P0 and P1 and between the positions P2 and P3. The carrier 2 is moved at a high speed between the positions P1 and P3.

The operation of the mold opening/closing speed control device will now be described in detail.

Teaching processing will be described wherein the acceleration/deceleration positions P0 to P3 are taught in the controller 11.

FIG. 2(a) is an operation flow chart for explaining teaching processing. The molds 8 and 9 are mounted on the base 1 and the carrier 2, respectively, and are closed. A mold opening/closing speed button in the teaching/operation mode selecting means in the manual input unit 16 is depressed to set the teaching mode (step 101).

The CPU 12 causes the servo motor M to rotate at a low speed through the input/output circuit 15 and the motor driver 17, thereby moving the carrier 2 to the right in FIG. 1 (step 102). When the molds 8 and 9 are opened to be no longer in contact with each other and slightly separated from each other, that is, when the carrier 2 is located at the position P1, an operator depresses a position input key or the like as the teaching means on the manual input unit 16 to generate a P1 position storage instructin (step 103). The CPU 12 stores the P1 position in the RAM 14 in response to a signal from the position sensor PC (step 104). When the carrier 2 is further moved and stopped at the position P2, a position storage instruction is entered again (step 105), and the stop position P2 is stored in the RAM 14 (step 106). The motor M is then stopped (step 107). At the same time, the CPU 12 subtracts from the stop position P2 a constant A which is determined by inertia of the servo motor M and the mold clamping unit and which is already stored during manufacturing to obtain an acceleration/deceleration position P3 (step 108). The position P3 is stored in the RAM 14 (step 109). As a result, all the acceleration/deceleration positions P0 to P3 are stored in the RAM 14. In this embodiment, the position P0 representing the closing point of the molds serve as the origin. If the origin is to be stored, the teaching mode is set and the position P0 is stored. Thereafter, the servo motor M is driven.

The above operations are performed in the teaching mode. An operation will be described wherein the molds 8 and 9 are opened/closed on the basis of the acceleration/deceleration positions P0 to P3 stored as described above.

When a mold clamping instruction is generated, the CPU 12 drives the motor M at a low speed to accelerate the carrier 2, thereby moving the carrier 2 to the left in FIG. 1 (step 110), as shown in FIG. 2(b). The CPU 12 checks in step 111 whether or not the carrier 2 has reached the position P3 in accordance with the signal from the position sensor PC. If YES in step 111, the motor M is driven at a high speed, and the CPU 12 checks whether or not the carrier 2 has reached the position P1 (steps 112 and 113). When the CPU 12 determines that the carrier 2 has reached the position P1, the motor M is driven at a low speed; and when the carrier has reached the position P0, i.e., the origin, the servo motor M is stopped (steps 114, 115 and 116). Mold clamping is thus completed. For mold opening, as shown in FIG. 2(c), when a mold opening instruction is generated, the servo motor M is driven at a low speed until the molds are completely opened, i.e., the carrier 2 has reached the position P1 (steps 117 and 118). Subsequently, the carrier 2 is driven at a high speed up to the position P3 (steps 119 and 120). The servo motor M is driven at a low speed from the position P3 and stopped at the stop position P2 (steps 121, 122 and 123), thus completing mold opening.

What is claimed is:

1. A mold opening/closing speed control device in an injection molding apparatus having molds, comprising:
   teaching/operation mode selecting means, manually operable by an operator, for selecting either a teaching mode for teaching an acceleration/deceleration position of a mold opening/closing speed, or an operation mode for opening/closing molds;
   teaching means, manually operable by the operator, for setting the acceleration/deceleration position;
   memory means for storing the acceleration/deceleration position set by said teaching means;
   mold driving means, including a servo motor as a drive source, for moving the molds with respect to one another;
   position detecting means for detecting a moving position of the molds; and
   control means for determining whether either the teaching mode or the operation mode is selected by manual operation of said teaching/operation mode selecting means, for determining whether said teaching means is manually operated, for controlling said mold driving means to cause the molds to move at a low speed when said control means determines that the teaching mode is selected, for controlling said memory means to store therein a mold position detected by said position detecting means at the time said control means determines that the teaching mode is selected and that said teaching means is manually operated, and for controlling said mold driving means so that the opening/closing speed of the molds is controlled in accordance with the mold position stored in said memory means when said control means determines that the operation mode is selected.

2. A device according to claim 1, wherein said position detector comprises a position sensor, mounted on said servo motor integrally therewith, for detecting a rotational position of said servo motor.

3. A device according to claim 1, wherein said mold driving means comprises:
   a carrier having one of the molds mounted thereon;
   a ball screw fixed on said carrier having the mold thereon; and
   a nut threadably engaged with said ball screw and adapted to be rotatively driven by said servo motor.

4. A device according to claim 3, wherein said control means comprises a central processing unit.

5. A device according to claim 2, wherein said mold driving means comprises:
   a carrier having one of the molds mounted thereon;
   a ball screw fixed on said carrier having the mold thereon; and
   a nut threadably engaged with said ball screw and adapted to be rotatively driven by said servo motor.

6. A device according to claim 5, wherein said control means comprises a central processing unit.

* * * * *